United States Patent
Ma et al.

(10) Patent No.: US 9,604,545 B2
(45) Date of Patent: Mar. 28, 2017

(54) CARRIER COMMUNICATION METHOD AND SYSTEM BASED ON CHARGING-DISCHARGING OF ELECTRIC VEHICLE AND CARRIER DEVICE

(71) Applicants: Shenzhen BYD Auto R&D Company Limited, Shenzhen, Guangdong (CN); BYD Company Limited, Shenzhen (CN)

(72) Inventors: Xianhong Ma, Shenzhen (CN); Weiqun Wang, Shenzhen (CN)

(73) Assignees: Shenzhen BYD Auto R&D Company Limited (CN); BYD Company Limited (CN)

( * ) Notice: Subject to any disclaimer, the term of this patent is extended or adjusted under 35 U.S.C. 154(b) by 0 days.

(21) Appl. No.: 14/369,923

(22) PCT Filed: Dec. 31, 2012

(86) PCT No.: PCT/CN2012/088069
§ 371 (c)(1),
(2) Date: Jun. 30, 2014

(87) PCT Pub. No.: WO2013/097819
PCT Pub. Date: Jul. 4, 2013

(65) Prior Publication Data
US 2014/0369431 A1    Dec. 18, 2014

(30) Foreign Application Priority Data

Dec. 31, 2011   (CN) .......................... 2011 1 0458395
Dec. 31, 2011   (CN) ..................... 2011 2 0571932 U
(Continued)

(51) Int. Cl.
*B60L 11/18*    (2006.01)
*H02J 7/00*     (2006.01)
(Continued)

(52) U.S. Cl.
CPC .......... *B60L 11/1851* (2013.01); *B60L 1/003* (2013.01); *B60L 3/003* (2013.01); *B60L 3/0046* (2013.01);
(Continued)

(58) Field of Classification Search
CPC .............. B60L 11/1816; B60L 11/1824; B60L 11/1838; B60L 11/1846; B60L 11/18;
(Continued)

(56) References Cited

U.S. PATENT DOCUMENTS 5,471,655 A * 11/1995 Kivari ........................ 455/127.5
5,994,874 A   11/1999 Hirose
(Continued)

FOREIGN PATENT DOCUMENTS

CN       1625014 A    6/2005
CN       1634725 A    7/2005
(Continued)

OTHER PUBLICATIONS

International Search Report for Application No. PCT/CN2012/088041 dated Apr. 4, 2013.
(Continued)

*Primary Examiner* — David B. Lugo
(74) *Attorney, Agent, or Firm* — Lerner, David, Littenberg, Krumholz & Mentlik, LLP

(57) ABSTRACT

A carrier communication method and system based on charging-discharging of an electric vehicle and a carrier device are disclosed. The carrier communication method comprises: determining whether a carrier signal from a peripheral apparatus is detected at an interface harness and if yes, determining whether the carrier signal is correct, when the electric vehicle is powered on to start; when the electric vehicle detects the carrier signal and the carrier signal is correct, receiving the carrier signal via the interface
(Continued)

harness; and performing a coupling and filtering on the carrier signal to convert the carrier signal into a standard carrier signal and demodulating the standard carrier signal into a digital signal to obtain information about the peripheral apparatus.

11 Claims, 7 Drawing Sheets

(30) Foreign Application Priority Data

| | | | |
|---|---|---|---|
| Jun. 7, 2012 | (CN) | | 2012 1 0185660 |
| Jun. 7, 2012 | (CN) | | 2012 2 0266009 U |
| Jun. 27, 2012 | (CN) | | 2012 1 0214502 |
| Jun. 27, 2012 | (CN) | | 2012 2 0303636 U |

(51) Int. Cl.
| | |
|---|---|
| *H02J 7/02* | (2016.01) |
| *H04B 3/54* | (2006.01) |
| *B60L 3/00* | (2006.01) |
| *B60L 1/00* | (2006.01) |
| *H02J 3/32* | (2006.01) |
| *H02J 7/34* | (2006.01) |

(52) U.S. Cl.
CPC .......... *B60L 3/0069* (2013.01); *B60L 11/18* (2013.01); *B60L 11/1803* (2013.01); *B60L 11/1805* (2013.01); *B60L 11/185* (2013.01); *B60L 11/1809* (2013.01); *B60L 11/1811* (2013.01); *B60L 11/1812* (2013.01); *B60L 11/1814* (2013.01); *B60L 11/1816* (2013.01); *B60L 11/1818* (2013.01); *B60L 11/1838* (2013.01); *B60L 11/1842* (2013.01); *B60L 11/1861* (2013.01); *B60L 11/1872* (2013.01); *H02J 3/32* (2013.01); *H02J 7/007* (2013.01); *H02J 7/0036* (2013.01); *H02J 7/0054* (2013.01); *H02J 7/0055* (2013.01); *H02J 7/0063* (2013.01); *H02J 7/0065* (2013.01); *H02J 7/0068* (2013.01); *H02J 7/02* (2013.01); *H02J 7/345* (2013.01); *H04B 3/542* (2013.01); *B60L 2210/12* (2013.01); *B60L 2210/14* (2013.01); *B60L 2210/30* (2013.01); *B60L 2210/40* (2013.01); *B60L 2210/42* (2013.01); *B60L 2230/12* (2013.01); *B60L 2240/527* (2013.01); *B60L 2240/529* (2013.01); *B60L 2240/545* (2013.01); *B60L 2240/547* (2013.01); *B60L 2240/549* (2013.01); *B60L 2250/12* (2013.01); *B60L 2270/147* (2013.01); *H02J 7/022* (2013.01); *H02J 2007/0067* (2013.01); *Y02E 60/721* (2013.01); *Y02T 10/705* (2013.01); *Y02T 10/7005* (2013.01); *Y02T 10/7044* (2013.01); *Y02T 10/7072* (2013.01); *Y02T 10/7225* (2013.01); *Y02T 10/7233* (2013.01); *Y02T 10/7241* (2013.01); *Y02T 10/92* (2013.01); *Y02T 90/121* (2013.01); *Y02T 90/127* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 10/126* (2013.01); *Y04S 30/14* (2013.01)

(58) Field of Classification Search
CPC .......... B60L 11/1803; B60L 11/1805; B60L 11/1809; B60L 11/1811; B60L 11/1812; B60L 11/1814; B60L 11/1818; B60L 11/1842; B60L 11/185; B60L 11/1851; B60L 11/1861; B60L 11/1872; B60L 1/003; B60L 3/003; B60L 3/0046; B60L 3/0069; H04B 3/54; H04B 3/542; H02J 7/007; H02J 7/02; H02J 7/0036; H02J 7/0054; H02J 7/0055; H02J 7/0062; H02J 7/0065; H02J 7/0068; H02J 7/022; H02J 7/345; H02J 3/32
See application file for complete search history.

(56) References Cited

U.S. PATENT DOCUMENTS

| | | | |
|---|---|---|---|
| 6,690,719 B1 * | 2/2004 | Raphaeli et al. | 375/222 |
| 7,489,106 B1 | 2/2009 | Tikhonov | |
| 8,242,627 B2 | 8/2012 | Ichikawa | |
| 8,274,262 B2 | 9/2012 | Harada | |
| 8,421,271 B2 | 4/2013 | King et al. | |
| 8,478,469 B2 | 7/2013 | Ueo et al. | |
| 8,810,060 B2 | 8/2014 | Kamaga | |
| 2003/0220026 A1 | 11/2003 | Oki et al. | |
| 2004/0017175 A1 | 1/2004 | Lee et al. | |
| 2004/0062059 A1 | 4/2004 | Cheng et al. | |
| 2005/0231172 A1 | 10/2005 | Kato et al. | |
| 2007/0075661 A1 | 4/2007 | Hsu | |
| 2008/0180058 A1 | 7/2008 | Patel et al. | |
| 2008/0185999 A1 | 8/2008 | Matsukawa et al. | |
| 2009/0066291 A1 | 3/2009 | Tien et al. | |
| 2009/0079389 A1 | 3/2009 | Ohtomo | |
| 2009/0096424 A1 | 4/2009 | Ambrosio et al. | |
| 2009/0184681 A1 | 7/2009 | Kuno | |
| 2009/0295224 A1 | 12/2009 | Kobayashi et al. | |
| 2010/0027305 A1 | 2/2010 | Oyobe et al. | |
| 2010/0079004 A1 | 4/2010 | Keefe | |
| 2010/0091529 A1 | 4/2010 | Jakeman et al. | |
| 2010/0096918 A1 | 4/2010 | Sawada et al. | |
| 2010/0164287 A1 | 7/2010 | Komazawa et al. | |
| 2010/0181829 A1 | 7/2010 | Ichikawa et al. | |
| 2010/0214055 A1 | 8/2010 | Fuji et al. | |
| 2010/0219794 A1 | 9/2010 | Sugimoto et al. | |
| 2010/0244558 A1 | 9/2010 | Mitsutani et al. | |
| 2011/0005037 A1 | 1/2011 | Kim | |
| 2011/0020174 A1 | 1/2011 | Rauschnabel et al. | |
| 2011/0040436 A1 | 2/2011 | Yamamoto et al. | |
| 2011/0050174 A1 | 3/2011 | King et al. | |
| 2011/0062962 A1 | 3/2011 | Wolf et al. | |
| 2011/0084664 A1 | 4/2011 | White et al. | |
| 2011/0101915 A1 | 5/2011 | Mitsutani | |
| 2011/0115425 A1 | 5/2011 | Olsson | |
| 2011/0193532 A1 | 8/2011 | Iwanaga et al. | |
| 2011/0221374 A1 | 9/2011 | Maebara et al. | |
| 2011/0245987 A1 | 10/2011 | Pratt et al. | |
| 2011/0304298 A1 | 12/2011 | Gow et al. | |
| 2012/0049771 A1 | 3/2012 | Komatsu | |
| 2012/0112528 A1 | 5/2012 | Fassnacht | |
| 2012/0123625 A1 | 5/2012 | Ueo et al. | |
| 2012/0131360 A1 * | 5/2012 | Zyren et al. | 713/310 |
| 2012/0153717 A1 | 6/2012 | Obayashi et al. | |
| 2013/0038424 A1 * | 2/2013 | Katar et al. | 340/5.8 |
| 2014/0042807 A1 | 2/2014 | Bouchez et al. | |

FOREIGN PATENT DOCUMENTS

| | | |
|---|---|---|
| CN | 101388560 A | 3/2009 |
| CN | 200910109953 A | 10/2009 |
| CN | 200920261006 U | 11/2009 |
| CN | 201594757 U | 9/2010 |
| CN | 101997336 A | 3/2011 |
| CN | 201781330 U | 3/2011 |
| CN | 102025182 A | 4/2011 |
| CN | 102045086 A | 5/2011 |
| CN | 102055226 A | 5/2011 |
| CN | 201839022 U | 5/2011 |
| CN | 201876820 U | 6/2011 |
| CN | 201877856 U | 6/2011 |
| CN | 102118184 A | 7/2011 |
| CN | 201898359 U | 7/2011 |

(56) References Cited

FOREIGN PATENT DOCUMENTS

| | | |
|---|---|---|
| CN | 102185343 A | 9/2011 |
| CN | 102185375 A | 9/2011 |
| CN | 102195504 A | 9/2011 |
| CN | 102222928 A | 10/2011 |
| CN | 201120560299 U | 12/2011 |
| CN | 202276163 U | 6/2012 |
| CN | 102673422 A | 9/2012 |
| CN | 202435108 U | 9/2012 |
| CN | 202455130 U | 9/2012 |
| CN | 102774284 A | 11/2012 |
| CN | 102882249 A | 1/2013 |
| CN | 102904300 A | 1/2013 |
| CN | 102916464 A | 2/2013 |
| EP | 0985570 A2 | 3/2000 |
| EP | 1531075 A1 | 5/2005 |
| EP | 2020726 A2 | 2/2009 |
| EP | 2039560 A1 | 3/2009 |
| EP | 2290778 A2 | 3/2011 |
| JP | H06141488 A | 5/1994 |
| JP | 2009077557 A | 4/2009 |
| JP | 2009290920 A | 12/2009 |
| JP | 2010178431 A | 8/2010 |
| JP | 2010252520 A | 11/2010 |
| JP | 2011083124 A | 4/2011 |
| JP | 2011176959 A | 9/2011 |
| WO | 2010079074 A1 | 7/2010 |
| WO | 2011013388 A2 | 2/2011 |

OTHER PUBLICATIONS

International Search Report for Application No. PCT/CN2012/088061 dated Apr. 4, 2013.

International Search Report for Application No. PCT/CN2012/088069 dated Apr. 18, 2013.

International Search Report for Application No. PCT/CN2012/088094 dated Apr. 18, 2013.

International Search Report for Application No. PCT/CN2012/088058 dated Apr. 11, 2013.

Colak, 1.; Tuncay, N: "High current, low voltage modular power converter for lead acid battery charging", Sustainable Energy Technologies, 2008. ICSET 2008. IEEE International Conference on, Nov. 24, 2008 (Nov. 24, 2008).

\* cited by examiner

CARRIER COMMUNICATION METHOD AND SYSTEM BASED ON CHARGING-DISCHARGING OF ELECTRIC VEHICLE AND CARRIER DEVICE

CROSS-REFERENCE TO RELATED APPLICATIONS

The present application is a national phase entry under 35 U.S.C §371 of International Application No. PCT/CN2012/088069, filed Dec. 31, 2012, which claims priority to Chinese Application Nos. 201220303636.X, filed Jun. 27, 2012; 201210214502.5, filed Jun. 27, 2012; 201210185660.2, filed Jun. 7, 2012; 201220266009.3, filed Jun. 7, 2012; 201110458395.6 filed Dec. 31, 2011; 201120571932.3, filed Dec. 31, 2011, all of which are hereby incorporated herein by reference.

FIELD

Embodiments of the present disclosure generally relate to a vehicle control technology field, and more particularly, to a carrier communication method and system based on charging-discharging of an electric vehicle as well as a carrier device.

BACKGROUND

With the development of science and technology, fuel vehicles are being replaced by environment friendly and energy saving electric vehicles. However, the popularization of the electric vehicles encounters some problems, among which high driving mileage and fast charging technology have become a major problem in the promotion of electric vehicles.

Currently, large-capacity batteries are used in most electric vehicles. However, although these batteries may enhance the endurance time of the electric vehicle, they make a charging time too long. Although a specialized DC (direct current) charging station may charge a battery quickly, problems such as high cost and large occupied area make the popularity of such an infrastructure encounter a certain difficulty. Moreover, because of a limited space of the vehicle, an in-vehicle charger may not satisfy the requirement of a charging power due to the limitation of its volume.

A charging solution currently used in the market comprises the following solutions.

Solution (1)

As shown in FIGS. 1-2, an in-vehicle charge-discharge device in this solution mainly includes a three-phase power transformer 1', a three-phase bridge circuit 2' consisting of six thyristor elements, a constant-voltage control device AUR, and a constant-current control device ACR. However, this solution causes a serious waste of space and cost.

Solution (2)

As shown in FIG. 3, an in-vehicle charge-discharge device in this solution includes two charging sockets 15', 16' to adapt to the single-phase/three-phase charging, which increases the cost. A motor driving loop includes a filtering module consisting of an inductor L1' and a capacitor C1'. When a motor is driven, a loss of a three-phase current is generated when it flows through the filtering module, which causes a waste of an electric quantity of a battery. With this solution, during the charging or discharging operation, an inverter 13' rectifies/inverts an AC (alternating current) electricity, and the voltage after the rectifying/inverting may not be adjusted, such that a battery operation voltage range is narrow.

Therefore, most AC charging technologies currently used in the market are a single-phase charging technology, which has disadvantages of low charging power, long charging time, large hardware volume, single function, restriction by voltage levels of different regional grids, etc.

In addition, when the electric vehicle is charged or discharged by means of the AC charging technologies, neither the charging pile and the load can obtain information about the electric vehicle, nor the vehicle can obtain information about the peripheral apparatus. Moreover, the bus data communication technology requires a dedicated data harness, thus increasing manufacturing cost and maintenance difficulty and causing unstable factors to the data transmission in the electric vehicle. In addition, due to a limitation of the national standard charging gun, each of seven wires in the charging gun has its own functions, and thus no spare wire can be used to erect the dedicated communication bus.

There are currently a variety of vehicle bus standards, in which the CAN bus is widely used. These buses require dedicated data harnesses, and due to the limitation of the charging gun standard, a number of the dedicated data harnesses cannot be increased. Therefore, the existing bus technologies do not have spare harness and do not have simplicity and applicability.

SUMMARY

Embodiments of the present disclosure seek to solve at least one of the problems existing in the related art to at least some extent.

For this, a first object of the present disclosure is to provide a carrier communication method based on charging-discharging of an electric vehicle, which can implement data transmission and sharing between the vehicle and respective ECUs (Electrical Control Units) of a peripheral apparatus without additional harness, and implement the carrier communication by using other signal wires as a communication medium, thus avoiding construction and investment of a new communication network and reducing manufacturing cost and maintenance difficulty. A second object of the present disclosure is to provide a carrier communication system based on charging-discharging of an electric vehicle. A third object of the present disclosure is to provide a carrier device.

To achieve the above object, embodiments of a first aspect of the present disclosure provide a carrier communication method based on charging-discharging of an electric vehicle. The carrier communication method includes: S1: determining whether a carrier signal from a peripheral apparatus is detected at an interface harness and if yes, determining whether the carrier signal is correct, after the electric vehicle is powered on to start; S2: when the electric vehicle detects the carrier signal and the carrier signal is correct, receiving the carrier signal via the interface harness; S3: performing a coupling and a filtering on the carrier signal by the electric vehicle to convert the carrier signal into a standard carrier signal and demodulating the standard carrier signal into a digital signal to obtain information about the peripheral apparatus.

With the carrier communication method according to embodiments of the present disclosure, when the electric vehicle is powered on to start and it is determined the carrier signal is correct, the carrier signal is received via the interface harness and then converted into the standard carrier signal by performing the coupling and filtering on it. Finally, the standard carrier signal is demodulated into the digital signal, thus facilitating obtaining the information on the peripheral apparatus. The method implements the data transmission and sharing between the vehicle and each ECU module of the peripheral apparatus without additional harness, and implements the carrier communication by using other signal wires as the communication medium, thus avoiding construction and investment of a new communication network and reducing manufacturing cost and maintenance difficulty.

Embodiments of a second aspect of the present disclosure provide a carrier communication system based on charging-discharging of an electric vehicle. The carrier communication system includes a peripheral apparatus and an electric vehicle. The peripheral apparatus includes a first carrier device and the first carrier device is configured to receive data sent from a control module of the peripheral apparatus, to modulate the data into an analog signal, and to couple an amplified analog signal onto an interface harness of the peripheral apparatus after performing a power amplification on the analog signal, so as to generate a carrier signal; the electric vehicle includes a second carrier device and the second carrier device is configured to determine whether the carrier signal sent from the peripheral apparatus is detected at the interface harness and whether the carrier signal is correct when the electric vehicle is powered on to start, to receive the carrier signal via the interface harness when the carrier signal is detected and the carrier signal is correct, to perform a coupling and a filtering on the carrier signal to convert the carrier signal into a standard carrier signal and to demodulate the standard carrier signal into a digital signal to obtain information about the peripheral apparatus.

With the carrier communication system according to embodiments of the present disclosure, when the electric vehicle is powered on to start and it is determined the carrier signal is correct, the carrier signal is received via the interface harness and then converted into the standard carrier signal by performing the coupling and filtering on it. Finally, the standard carrier signal is demodulated into the digital signal, thus facilitating obtaining the information on the peripheral apparatus. The system implements the data transmission and sharing between the vehicle and each ECU module of the peripheral apparatus without additional harness, and implements the carrier communication by using other signal wires as the communication medium, thus avoiding construction and investment of a new communication network and reducing manufacturing cost and maintenance difficulty.

Embodiments of a third aspect of the present disclosure provide a carrier device. The carrier device is disposed in an apparatus and communicated with a control module in the apparatus via a SCI, and the carrier device includes: a SCI (Serial Communication Interface) connected with the control module in the apparatus; a micro-control module configured to receive information about the control module via the SCI; a modem module configured to modulate the information into an analog signal and to perform a power amplification on the analog signal; and a coupling module configured to couple a power amplified analog signal to an interface harness of the apparatus.

With the carrier device according to embodiments of the present disclosure, when the electric vehicle is powered on to start and it is determined the carrier signal is correct, the carrier signal is received via the interface harness and then converted into the standard carrier signal by performing the filtering and coupling on it. Finally, the standard carrier signal is demodulated into the digital signal, thus facilitating obtaining the information on the peripheral apparatus. The carrier device implements the data transmission and sharing between the vehicle and respective ECUs of the peripheral apparatus without additional harness, and implements the carrier communication by using other signal wires as the communication medium, thus avoiding construction and investment of a new communication network and reducing manufacturing cost and maintenance difficulty.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the accompanying drawings, in which.

DETAILED DESCRIPTION

Figure 1:
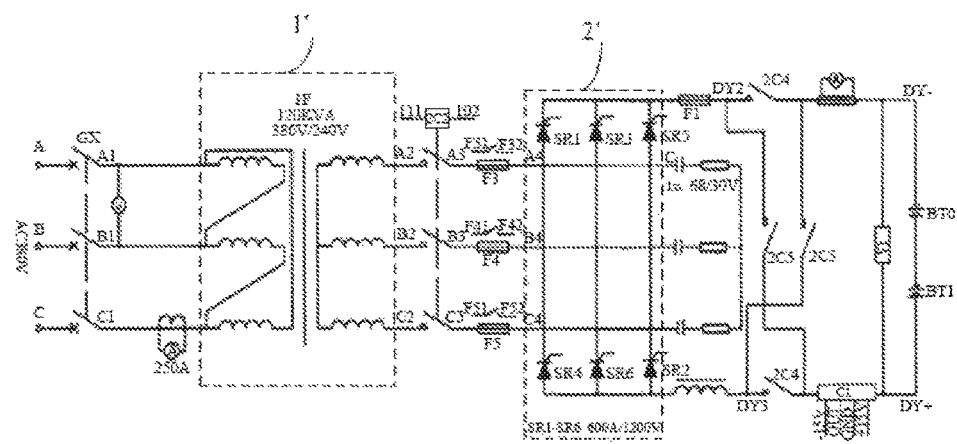
FIG. 1 is a circuit diagram of a conventional in-vehicle charging-discharging device.
Figure 2:
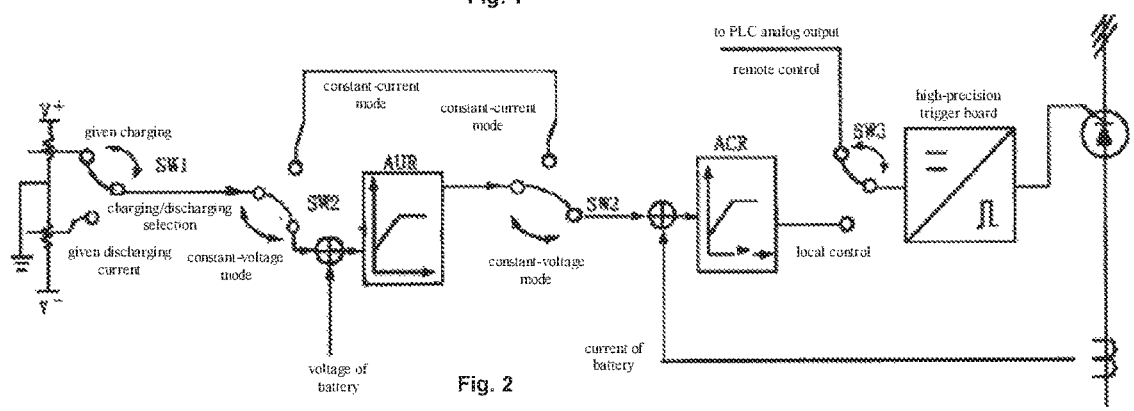
FIG. 2 is a schematic diagram showing a control of the conventional in-vehicle charging-discharging device.
Figure 3:
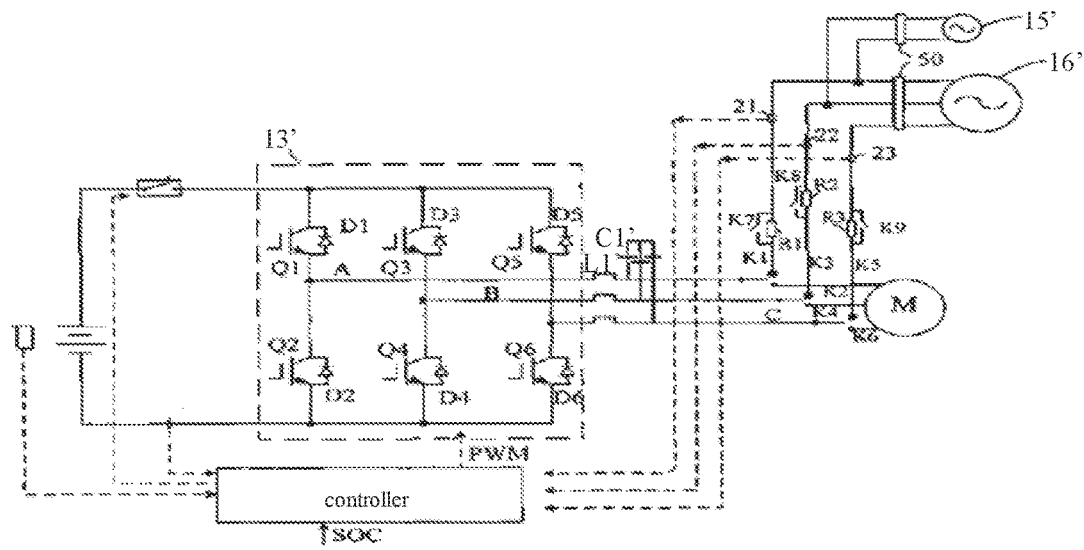
FIG. 3 is a circuit diagram of another conventional in-vehicle charging-discharging device.

Reference will be made in detail to embodiments of the present disclosure. The same or similar elements and the elements having same or similar functions are denoted by like reference numerals throughout the descriptions. The embodiments described herein with reference to drawings are explanatory, illustrative, and used to generally understand the present disclosure. The embodiments shall not be construed to limit the present disclosure.

In the specification, unless specified or limited otherwise, relative terms such as "central", "longitudinal", "lateral", "front", "rear", "right", "left", "inner", "outer", "lower", "upper", "horizontal", "vertical", "above", "below", "up", "top", "bottom", "inner", "outer", "clockwise", "anticlockwise" as well as derivative thereof (e.g., "horizontally", "downwardly", "upwardly", etc.) should be construed to refer to the orientation as then described or as shown in the drawings under discussion. These relative terms are for convenience of description and do not require that the present disclosure be constructed or operated in a particular orientation.

In addition, terms such as "first" and "second" are used herein for purposes of description and are not intended to indicate or imply relative importance or significance. Thus, features limited by "first" and "second" are intended to indicate or imply including one or more than one these features. In the description of the present disclosure, "a plurality of" relates to two or more than two.

In the description of the present disclosure, unless specified or limited otherwise, it should be noted that, terms "mounted," "connected" "coupled" and "fastened" may be understood broadly, such as permanent connection or detachable connection, electronic connection or mechanical connection, direct connection or indirect connection via intermediary, inner communication or interreaction between two elements. These having ordinary skills in the art should understand the specific meanings in the present disclosure according to specific situations.

In the description of the present disclosure, a structure in which a first feature is "on" a second feature may include an embodiment in which the first feature directly contacts the second feature, and may also include an embodiment in which an additional feature is formed between the first feature and the second feature so that the first feature does not directly contact the second feature, unless otherwise specified. Furthermore, a first feature "on," "above," or "on top of" a second feature may include an embodiment in which the first feature is right "on," "above," or "on top of" the second feature, and may also include an embodiment in which the first feature is not right "on," "above," or "on top of" the second feature, or just means that the first feature has a sea level elevation larger than the sea level elevation of the second feature. While first feature "beneath," "below," or "on bottom of" a second feature may include an embodiment in which the first feature is right "beneath," "below," or "on bottom of" the second feature, and may also include an embodiment in which the first feature is not right "beneath," "below," or "on bottom of" the second feature, or just means that the first feature has a sea level elevation smaller than the sea level elevation of the second feature.

Figure 4:
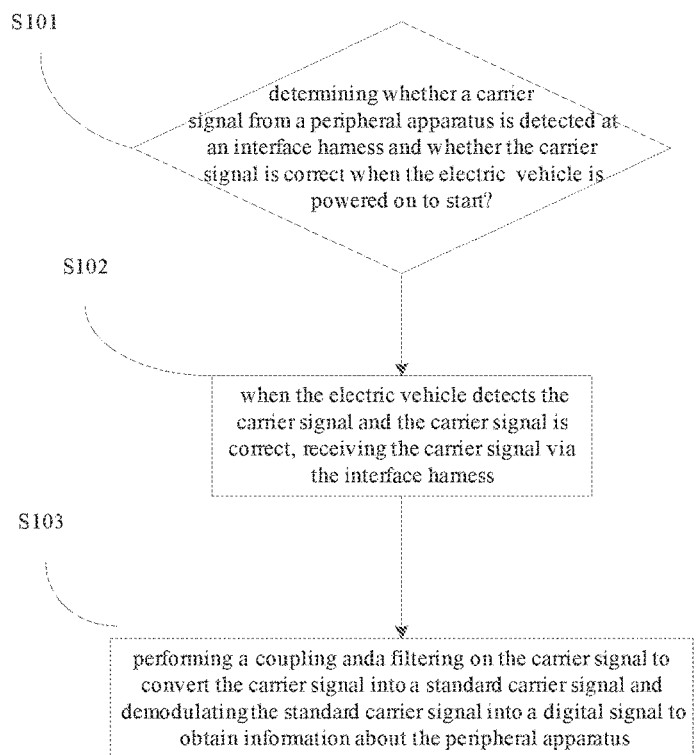
FIG. 4 is a flow chart of a carrier communication method based on charging-discharging of an electric vehicle according to an embodiment of the present disclosure.

As shown in FIG. 4, according to embodiments of the present disclosure, a carrier communication method based on charging-discharging of an electric vehicle includes following steps.

At step S101, it is determined whether a carrier signal from a peripheral apparatus is detected at an interface harness and whether the carrier signal is correct, when the electric vehicle is powered on. The carrier signal is obtained by modulating the information about the peripheral apparatus into an analog signal with the peripheral apparatus and coupling a power amplified analog signal to the interface harness after performing a power amplification on the analog signal. The peripheral apparatus is a charging pile and the interface harness is a CP signal harness of a charging gun of the charging pile.

Specifically, the electric vehicle modulates vehicle information into the analog signal, performs the power amplification on the analog signal, and couples the power amplified analog signal to the interface harness of the electric vehicle to generate the carrier signal; the peripheral apparatus determines whether the carrier signal from the electric vehicle is detected at the interface harness of the electric vehicle and whether the carrier signal is correct; when the peripheral apparatus detects the carrier signal and the carrier signal is correct, the peripheral apparatus receives the carrier signal via the interface harness; and the peripheral apparatus performs the coupling and the filtering on the carrier signal to convert the carrier signal into a standard carrier signal and demodulates the standard carrier signal into a digital signal to obtain the vehicle information.

Figure 5:
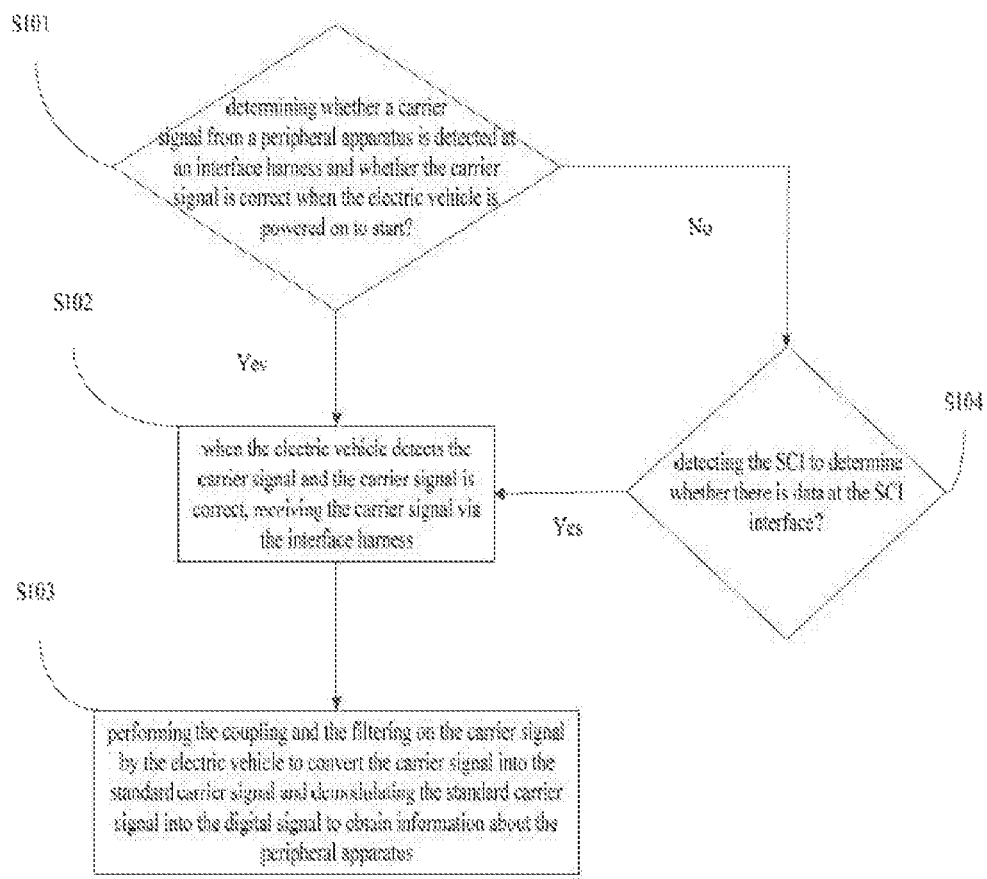
FIG. 5 is a flow chart of a carrier communication method based on charging-discharging of an electric vehicle according to another embodiment of the present disclosure.

Further, at step S101, when the carrier signal is not detected at the interface harness within an initial predetermined time, it is further determined whether the carrier signal is detected at a SCI (Serial Communication Interface), and if the carrier signal is detected at SCI, execute step S102. Moreover, at step 101, when the carrier signal is detected neither at the interface harness nor at the SCI within the initial predetermined time, it is re-determined whether the carrier signal is detected at the interface harness and whether the carrier signal is correct, and if no, proceed to execute step S104 to determine whether the carrier signal is detected at the SCI, as shown in FIG. 5.

Specifically, for detecting whether the carrier signal is correct, a plurality of parameters of the carrier signal are detected and each of the plurality of parameters is compared with a corresponding standard value respectively so as to determine whether the carrier signal is correct.

At step S102, when the electric vehicle detects the carrier signal and the carrier signal is correct, the carrier signal is received via the interface harness.

Specifically, the SCI of the electric vehicle is set in an interrupt state when the carrier signal is received via the interface harness.

At step S103, the electric vehicle performs the coupling and the filtering on the carrier signal to convert the carrier signal into the standard carrier signal and demodulates the standard carrier signal into the digital signal to obtain information about the peripheral apparatus.

Specifically, portions in a carrier communication system are connected with each other via the interface harness, which is an unspecialized harness and can also be used to transmit other signals. In the charging gun, the CP signal harness is used as the interface harness. The carrier communication system and a control system are communicated via the SCI. Herein, the CP signal harness in the charging gun is taken as an example of the carrier communication interface harness for explaining the carrier communication method.

When the system is powered on, the carrier communication system program enters a state in which data is received from the CP signal harness, and starts to detect whether there is the carrier signal and whether the carrier signal is correct, the result of which is used to determine whether to switch the system to a state in which data is received from the SCI. When the carrier signal is detected at the CP signal harness and the carrier signal is correct, the system starts to receive the data from the CP signal harness. At this time, the SCI is in the interrupt state, which means that the SCI interrupts receiving data and the SCI is at an initial value after being powered on. When the carrier signal is not detected at the very start, the system starts to detect the SCI to determine whether there is data sent to the SCI, so as to determine whether to enter the data receiving state. When data transmission occurs neither at the interface harness nor at the SCI, the system enters a re-determining state and re-detects the power cable to enter a new cycle.

Further, a carrier communication circuit receives information sent from the SCI of a main chip in the control system, and couples the information to the CP signal harness after modulating, demodulating and amplifying the information via a carrier module, thus implementing the communication with aid of the existing CP signal harness.

In order to implement the carrier communication, each control system module should include one carrier communication system to modulate and demodulate the information to be sent and to couple the information to the CP signal harness.

With the carrier communication method based on charging-discharging of the electric vehicle, when the electric vehicle is powered on and it is determined that the carrier signal is correct, the carrier signal is received via the interface harness and then converted into the standard carrier signal by performing the coupling and filtering on it. Finally, the standard carrier signal is demodulated into the digital signal, thus facilitating obtaining the information on the peripheral apparatus. The method implements the data transmission and sharing between the vehicle and respective ECUs (Electrical Control Units) of the peripheral apparatus without additional harness, and implements the carrier communication by using other signal wires as the communication medium, thus avoiding construction and investment of a new communication network and reducing manufacturing cost and maintenance difficulty.

Figure 6:
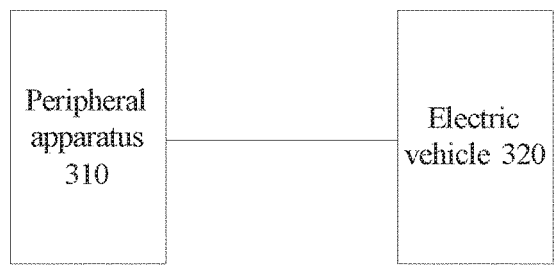
FIG. 6 is a block diagram of a carrier communication system based on charging-discharging of an electric vehicle according to an embodiment of the present disclosure.

FIG. 6 is a block diagram of a carrier communication system based on charging-discharging of an electric vehicle according to an embodiment of the present disclosure.

As shown in FIG. 6, according to embodiments of the present disclosure, the carrier communication system 300 based on charging-discharging of the electric vehicle includes a peripheral apparatus 310 and an electric vehicle 320.

The peripheral apparatus 310 includes a first carrier device, and the first carrier device is configured to receive data sent from a control module of the peripheral apparatus, to modulate the data into an analog signal, and to couple an amplified analog signal onto an interface harness of the peripheral apparatus after performing a power amplification on the analog signal, so as to generate a carrier signal. The peripheral apparatus 310 is a charging pile and the interface harness is a CP signal harness of a charging gun of the charging pile.

The electric vehicle 320 includes a second carrier device, and the second carrier device is configured to determine whether the carrier signal sent from the peripheral apparatus is detected at the interface harness and whether the carrier signal is correct after the electric vehicle is powered on to receive the carrier signal via the interface harness when the carrier signal is detected and the carrier signal is correct, to perform a coupling and a filtering on the carrier signal to convert the carrier signal into a standard carrier signal and to demodulate the standard carrier signal into a digital signal to obtain information about the peripheral apparatus.

Specifically, the second carrier device of the electric vehicle is further configured to detect a plurality of parameters of the carrier signal and to compare each of the plurality of parameters with a corresponding standard value respectively so as to determine whether the carrier signal is correct, in which the plurality of parameters include one or more of a duty ratio, an amplitude, a number of data items and a number of transmitting a same data item. The second carrier device of the electric vehicle is further configured to set a SCI of the electric vehicle in an interrupt state when the carrier signal is received via the interface harness. The second carrier device is further configured to determine whether the carrier signal is detected at the SCI when the carrier signal is not detected at the interface harness within an initial predetermined time. Moreover, the second carrier device is further configured to re-determine whether the carrier signal is detected at the interface harness when the carrier signal is detected neither at the interface harness nor at the SCI interface within the initial predetermined time.

Further, when the system is powered to started, the system program enters a state in which data is received from the interface harness, and starts to detect whether there is a carrier signal and whether the carrier signal is correct, the result of which is used to determine whether to switch the system to a state in which the data is received from the SCI. When the carrier signal is detected at the interface harness and is correct, the system starts to receive the data from the interface harness. At this time, the SCI is in the interrupt state, which means that the SCI interrupt receiving data and the SCI is at the initial value after being powered on. When the carrier signal is not detected at the very start, the system starts to detect the SCI to determine whether there is data sent to the SCI, so as to determine whether to enter the data receiving state. When data transmission occurs neither at the interface harness nor at the SCI, the system enters a re-determining state and re-detects the power cable to enter a new cycle. In order to avoid a data collision caused by the SCI being in the data receiving state and a data sending state synchronously, a status word is queried and the interrupt state is set in programs. No matter the data is received from the interface harness or the SCI, a condition of system channels is determined according to the interrupt state of the SCI, thus determining whether the data is sent from a MCU (Micro-Control Unit) to a power cable or to a communication apparatus. Once the data transmission is completed, the whole system returns to a detecting state and waits to start a new data transmission.

Figure 7:
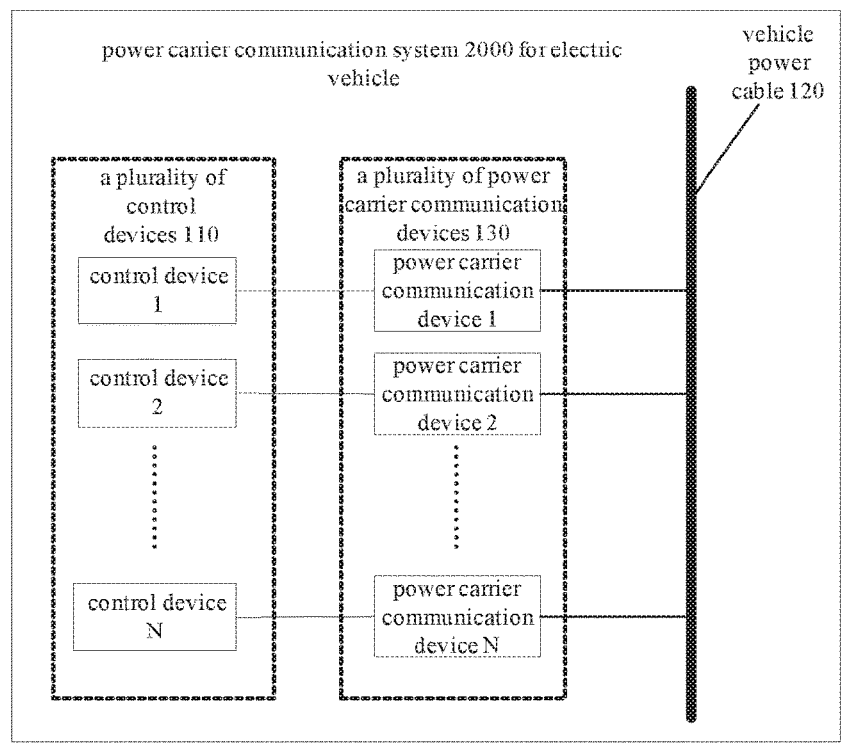
FIG. 7 is a block diagram of a power carrier communication system for an electric vehicle according to an embodiment of the present disclosure.

FIG. 7 is a block diagram of a power carrier communication system for an electric vehicle according to an embodiment of the present disclosure.

As shown in FIG. 7, the power carrier communication system 2000 includes a plurality of control devices 110, a vehicle power cable 120 and a plurality of power carrier communication devices 130.

Specifically, each of the control devices 110 has a communication interface, in which the communication interface may be, for example, but is not limited to, a serial communication interface SCI. The vehicle power cable 120 supplies power to the plurality of control devices 110, and the control devices 110 communicate with each other via the vehicle power cable 120. The plurality of power carrier communication devices 130 correspond to the plurality of control devices 110 respectively, and the plurality of control devices 110 are connected with corresponding power carrier communication devices 130 via their own communication interfaces respectively, and the power carrier communication devices 130 are connected with each other via the vehicle power cable 120. The power carrier communication devices 130 obtain a carrier signal from the vehicle power cable 120 so as to demodulate the carrier signal and send the demodulated carrier signal to the corresponding control device 110, and also receive and modulate information sent from the corresponding control device 110 and send the modulated information to the vehicle power cable 120.

With reference to FIG. 7, the plurality of control devices 110 include a control device 1 to a control device N (N is larger than or equal to 2, and N is an integer). The plurality of power carrier communication devices 130 corresponding to the plurality of control devices 110 include a power carrier communication device 1 to a power carrier communication device N. For example, when the control device 1 needs to communicate with the control device 2, the control device 2 first sends a carrier signal to the power carrier communication device 2, and the power carrier communication device 2 modulates the carrier signal and sends the modulated carrier signal to the vehicle power cable 120. Then, the power carrier communication device 1 obtains and demodulates the carrier signal from the vehicle power cable 120, and sends the demodulated carrier signal to the control device 1.

With the carrier communication system according to embodiments of the present disclosure, when the electric vehicle is powered on to start and it is determined the carrier signal is correct, the carrier signal is received via the interface harness and then converted into the standard carrier signal by performing the coupling and filtering on it. Finally, the standard carrier signal is demodulated into the digital signal, thus facilitating obtaining the information on the peripheral apparatus. The device implements the data transmission and sharing between the vehicle and respective ECUs of the peripheral apparatus without additional harness, and implements the carrier communication by using other signal wires as the communication medium, thus avoiding construction and investment of a new communication network and reducing manufacturing cost and maintenance difficulty.

Figure 8:
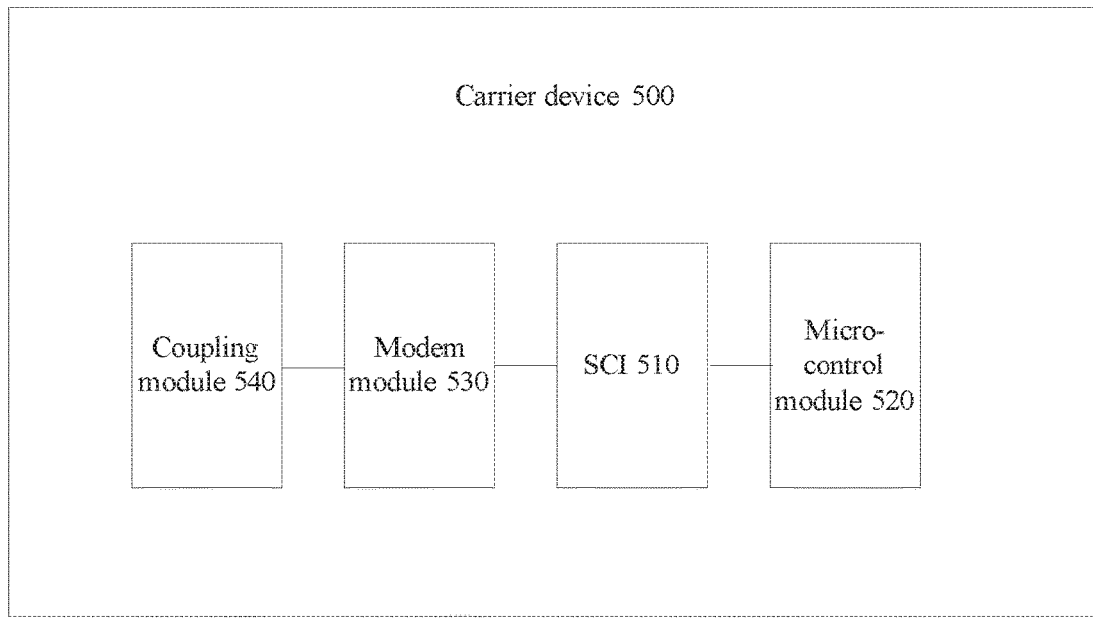
FIG. 8 is a block diagram of a carrier device according to an embodiment of the present disclosure.

FIG. 8 is a block diagram of a carrier device according to an embodiment of the present disclosure.

As shown in FIG. 8, according to embodiments of the present disclosure, the carrier device 500 includes a SCI 510, a micro-control module 520, a modem module 530 and a coupling module 540.

The micro-control module 520 receives information about the control module via the SCI 510 and the SCI 510 is connected with the micro-control module 520.

Specifically, the micro-control module 520 is further configured to determine whether a carrier signal from the peripheral apparatus is detected at the interface harness and whether the carrier signal is correct. The micro-control module 520 is further configured to analyze the digital signal to obtain information about the peripheral apparatus. The micro-control module 520 detects a plurality of parameters of the carrier signal and compares each of the plurality of parameters with a corresponding standard value respectively to determine whether the carrier signal is correct, in which the plurality of parameters include one or more of a duty ratio, an amplitude, a number of data items and a number of times of sending a same data item. The micro-control module 520 is configured to set the SCI 510 in an interrupt state when the coupling module 540 is receiving the carrier signal via the interface harness. Furthermore, the micro-control module 520 is further configured to determine whether the carrier signal is detected at the SCI 510 when the coupling module 540 does not receive the carrier signal via the interface harness within an initial predetermined time. Moreover, the micro-control module 520 is further configured to re-determine whether the carrier signal is detected at the interface harness when the coupling module 540 neither receive the carrier signal via the interface harness nor via the SCI 510 within the initial predetermined time.

Further, the micro-control module 520 does not have specific load control requirements. According to different functions, the micro-control module is divided into an internal system and an external system. The external system is mainly configured to communicate with an external environment of the system. With the external system, the system can receive instructions sent from the external environment and send state information about each unit in the system to the external environment. In the internal system, a master control unit is configured to convert the instructions from the external environment to specific information content and to send the specific information content to each appurtenant control unit. The master control unit is further configured to receive the state information from each slave control unit and to manage an operation of the whole system. A specific example is the carrier communication during an AC charging of the electric vehicle, in which a control module in the electric vehicle samples and receives vehicle information from the external environment and sends the vehicle information to the carrier module, thus implementing information sharing between the whole vehicle and the carrier module.

The modem module 530 is configured to modulate the formation into the analog signal and to perform a power amplification on the analog signal. The modem module 530 is further configured to demodulate the standard carrier signal into a digital signal and to send the digital signal to the micro-control module 520.

Specifically, in the carrier communication system, a signal output from the micro-control module MCU is a coded binary data series, and is converted into an analog signal after the signal modulation and demodulation.

Further, the data is sent as follows: the micro-control module communicates with a power carrier module via the SCI communication, and the data is converted to the analog signal for outputting by modulation and demodulation of the modem module, and then the analog signal is coupled to the interface harness by the coupling module after power amplification of the amplification module. The data is received as follows: the coupling module receives an AC signal from the interface harness and couples the AC signal to the receiving and filtering module, and the receiving and filtering module performs a multilevel filtering on the AC signal to convert the AC signal into a carrier signal with a acceptable frequency satisfying a carrier communication standard, and then the carrier signal is demodulated by the modem module to be converted into the digital signal and finally the data packet is sent to the micro-control module via the SCI communication.

The coupling module 540 is configured to couple the power amplified analog signal to the interface harness of the apparatus.

Specifically, the coupling module 540 is further configured to receive the carrier signal via the interface harness and to couple the carrier signal to a filtering module 550 when the micro-control module 520 detects the carrier signal and determines that the carrier signal is correct.

Further, the coupling module is a coupling circuit and is configured to transmit and receive a modulation-demodulation signal. Moreover, the coupling module is also a filtering system which can filter the carrier signal, a noise signal and a surge signal transmitted on the interface harness reliably.

Figure 9:
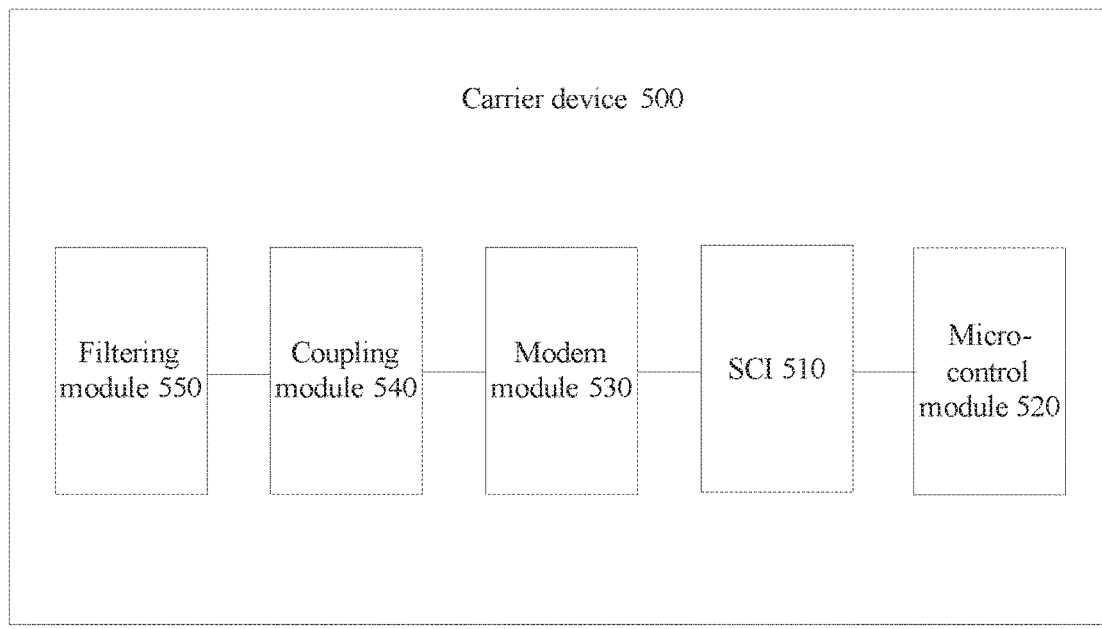
FIG. 9 is a block diagram of a carrier device according to another embodiment of the present disclosure.

FIG. 9 is a block diagram of a carrier device according to another embodiment of the present disclosure.

As shown in FIG. 9, according to embodiments of the present disclosure, the carrier device 500 further includes a filtering module 550.

The filtering module 550 is connected with the coupling module 540 and is configured to perform a multilevel filtering on the carrier signal to convert the carrier signal into the standard carrier signal.

With the carrier device according to embodiments of the present disclosure, when the electric vehicle is powered on to start and it is determined the carrier signal is correct, the carrier signal is received via the interface harness and then converted into the standard carrier signal by performing the coupling and filtering on it. Finally, the standard carrier signal is demodulated into the digital signal, thus facilitating obtaining the information on the peripheral apparatus. The device implements the data transmission and sharing between the vehicle and the each ECU of the peripheral apparatus without additional harness, and implements the carrier communication by using other signal wires as the communication medium, thus avoiding construction and investment of a new communication network and reducing manufacturing cost and maintenance difficulty.

Figure 10:
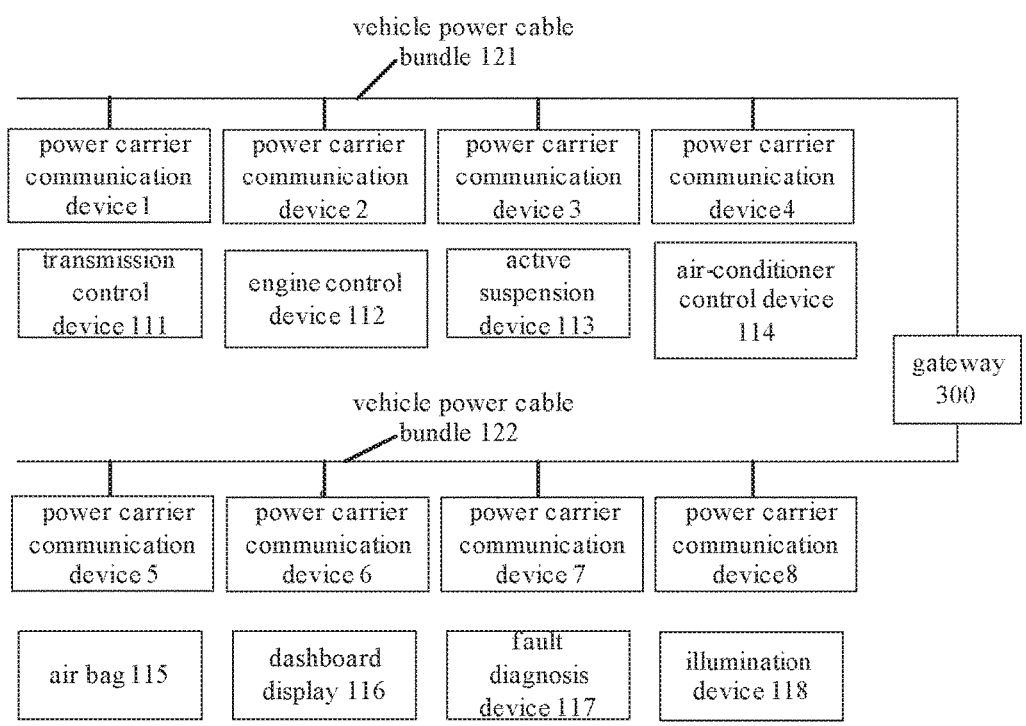
FIG. 10 is a schematic diagram showing a communication between eight power carrier communication devices and corresponding control devices according to an embodiment of the present disclosure.

FIG. 10 is a schematic diagram showing a communication between eight power carrier communication devices and corresponding control devices according to an embodiment of the present disclosure.

Further, as shown in FIG. 10, a plurality of power carrier communication devices such as eight power carrier communication devices 1-8 are connected with a gateway 300 via power cables 121 and 122, and each of the plurality of power carrier communication devices corresponds to one control device. For example, a power carrier communication device 1 corresponds to a transmission control device 111, a power carrier communication device 2 corresponds to an engine control device 112, a power carrier communication device 3 corresponds to an active suspension device 113, a power carrier communication device 4 corresponds to an air-conditioner control device 114, a power carrier communication device 5 corresponds to an air bag 115, a power carrier communication device 6 corresponds to a dashboard display 116, a power carrier communication device 7 corresponds to a fault diagnosis device 117, and a power carrier communication device 8 corresponds to an illumination device 118.

Figure 11:
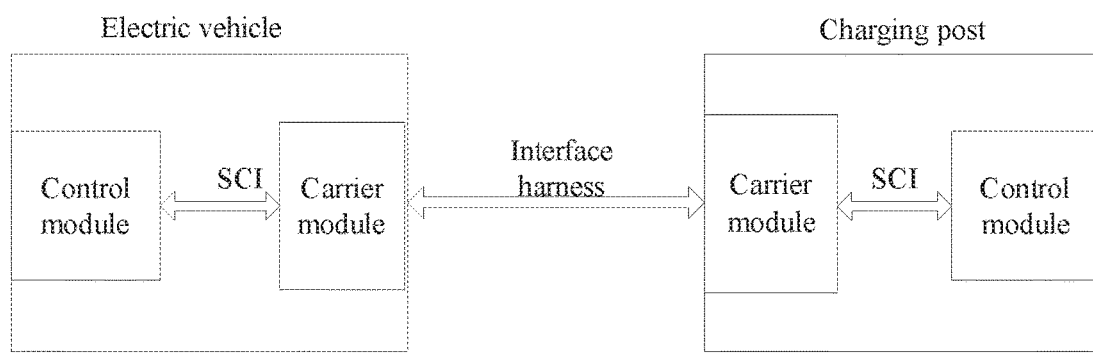
FIG. 11 is a block diagram showing a topological structure of an AC charging carrier communication network of an electric vehicle according to an embodiment of the present disclosure.

FIG. 11 is a block diagram showing a topological structure of an AC charging carrier communication network according to an embodiment of the present disclosure. In the carrier communication system of this topological structure, a peripheral apparatus module is communicated with the carrier communication module via a new carrier communication bus standard. The carrier communication module includes a modulation-demodulation circuit, an analog front-end amplifier circuit, a receiving and filtering circuit and a coupling circuit.

In practical application, the data is sent in such a way that the principle chip in the control system sends the data packet to the carrier module via the SCI, the carrier module modulates the data to convert it into the analog signal and outputs the analog signal, the sending and amplifying module performs the power amplification on the analog signal and sends the amplified signal to the coupling module, and the coupling module couples the amplified signal to interface harness of the control system.

Further, the data is received in such away that the coupling circuit in the carrier module receives the signal from the interface harness and couples the signal to the receiving and filtering circuit, the receiving and filtering circuit performs a multilevel filtering on the signal to convert the signal into the carrier signal with the acceptable frequency satisfying the carrier communication standard, and then the carrier signal is demodulated to be converted into the digital signal and the data packet is sent to the principle chip via the SCI communication.

Since the carrier communication system is formed by adopting any signal harness of the electric vehicle to connect with the peripheral apparatus, the communication between the electric vehicle and the peripheral apparatus is implemented via the carrier communication system. In the carrier communication system, the electric vehicle is connected with the carrier communication module in the charging pile and the load via the new carrier communication bus standard. The information is transmitted among different control modules via the same signal harness. The carrier bus data communication technology implements the data transmission and sharing between the vehicle and the respective ECUs of the peripheral apparatus without additional harness, and implements the carrier communication by using other signal wires as the communication medium, thus avoiding construction and investment of a new communication network and reducing manufacturing cost and maintenance difficulty.

Any procedure or method described in the flow charts or described in any other way herein may be understood to comprise one or more modules, portions or parts for storing executable codes that realize particular logic functions or procedures. Moreover, advantageous embodiments of the present disclosure comprises other implementations in which the order of execution is different from that which is depicted or discussed, including executing functions in a substantially simultaneous manner or in an opposite order according to the related functions. This should be understood by those skilled in the art to which embodiments of the present disclosure belong.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks, CD, etc.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A carrier communication method based on charging-discharging of an electric vehicle, comprising:
   S1: determining whether a carrier signal from a peripheral apparatus is detected at an interface harness and if yes, determining whether the carrier signal is correct, after the electric vehicle is powered on;
   S2: receiving the carrier signal via the interface harness, when the electric vehicle detects the carrier signal and the carrier signal is correct;
   S3: performing a coupling and a filtering on the carrier signal by the electric vehicle to convert the carrier signal into a standard carrier signal and demodulating the standard carrier signal into a digital signal to obtain information about the peripheral apparatus;
   wherein the method further comprises: setting a Serial Communication Interface (SCI) of the electric vehicle in an interrupt state when receiving the carrier signal via the interface harness; and
   wherein at step S1, when the carrier signal is not detected at the interface harness within a predetermined initial time, it is further determined whether the carrier signal is detected at the SCI of the electric vehicle; and if yes, execute step S2.

2. The carrier communication method according to claim 1, wherein determining whether the carrier signal is correct comprises:
   detecting a plurality of parameters of the carrier signal and comparing each of the plurality of parameters with a corresponding standard value respectively so as to determine whether the carrier signal is correct, in which the plurality of parameters comprise one or more of a duty ratio of the carrier signal, an amplitude of the carrier signal, a number of data items in the carrier signal and a number of times of sending a same data item.

3. The carrier communication method according claim 1, wherein at step S1, when the carrier signal is detected neither at the interface harness nor at the SCI within the predetermined initial time, it is re-determined whether the carrier signal is detected at the interface harness.

4. The carrier communication method according to claim 1, wherein the carrier signal is obtained by modulating the information about the peripheral apparatus into an analog signal with the peripheral apparatus and coupling an amplified analog signal to the interface harness after performing a power amplification on the analog signal.

5. The carrier communication method according to claim 1, further comprising:
   with the electric vehicle, modulating vehicle information into an analog signal, performing a power amplification on the analog signal and coupling a power amplified analog signal to the interface harness of the electric vehicle to generate a carrier signal;
   determining, with the peripheral apparatus, whether the carrier signal from the electric vehicle is detected at the interface harness of the electric vehicle and if yes, determining whether the carrier signal is correct;
   receiving the carrier signal via the interface harness when the peripheral apparatus detects the carrier signal and the carrier signal is correct; and
   with the peripheral apparatus, performing a coupling and a filtering on the carrier signal to convert the carrier signal into a standard carrier signal and demodulating the standard carrier signal into a digital signal to obtain the vehicle information.

6. A carrier communication system based on charging-discharging of an electric vehicle, comprising:
   a peripheral apparatus comprising a first carrier device, wherein the first carrier device comprises a first processor and a first memory storing instructions executable by the first processor, and the first processor is configured to execute the instructions stored in the first memory so as to receive data sent from a control module of the peripheral apparatus, to modulate the data into an analog signal, and to couple an amplified analog signal onto an interface harness of the peripheral apparatus after performing a power amplification on the analog signal, such that a carrier signal is generated;
   an electric vehicle comprising a second carrier device, wherein the second carrier device comprises a second processor and a second memory storing instructions executable by the second processor, and the second processor is configured to execute the instructions stored in the second memory so as to determine whether the carrier signal sent from the peripheral apparatus is detected at the interface harness and whether the carrier signal is correct when the electric vehicle is powered on, to receive the carrier signal via the interface harness when the carrier signal is detected and the carrier signal is correct, to perform a coupling and a filtering on the carrier signal to convert the carrier signal into a standard carrier signal and to demodulate the standard carrier signal into a digital signal to obtain information about the peripheral apparatus, wherein the second processor is further configured to set a Serial Communication Interface (SCI) of the electric vehicle in an interrupt state when the carrier signal is received via the interface harness; and wherein the second processor is further configured to determine whether the carrier signal is detected at the SCI when the carrier signal is not detected at the interface harness within a predetermined initial time.

7. The carrier communication system according to claim 6, wherein the second processor is further configured to detect a plurality of parameters of the carrier signal and to compare each of the plurality of parameters with a corresponding standard value respectively so as to determine whether the carrier signal is correct, in which the plurality of parameters comprise one or more of a duty ratio of the carrier signal, an amplitude of the carrier signal, a number of data items in the carrier signal and a number of times of sending a same data item.

8. The carrier communication system according to claim 6, wherein the second processor is further configured to re-determine whether the carrier signal is detected at the interface harness when the carrier signal is detected neither at the interface harness nor at the SCI within the predetermined initial time.

9. A carrier device, disposed in an electric vehicle and comprising:
    a Serial Communication Interface (SCI) connected with a peripheral apparatus;
    a processor, wherein the carrier processor communicates with the peripheral device via the SCI; and
    a memory storing instructions executable by the processor,
    wherein the processor is configured to:
    receive information from the peripheral apparatus via the SCI;
    modulate the information into an analog signal and perform a power amplification on the analog signal; and
    couple a power amplified analog signal to an interface harness of the peripheral apparatus,
    wherein the processor further communicates with the peripheral apparatus via the interface harness of the peripheral apparatus, and the processor is further configured to:
    determine whether a carrier signal from the peripheral apparatus is detected at the interface harness and whether the carrier signal is correct,
    receive the carrier signal via the interface harness when the carrier signal is detected at the interface harness and the carrier signal is correct,
    perform a multilevel filtering on the carrier signal to convert the carrier signal into a standard carrier signal,
    demodulate the standard carrier signal into a digital signal and analyze the digital signal to obtain information about the peripheral apparatus;
    wherein the processor is configured to set the SCI in an interrupt state when receiving the carrier signal via the interface harness; and
    wherein the processor is further configured to determine whether the carrier signal is detected at the SCI when the carrier signal is not received via the interface harness within a predetermined initial time.

10. The carrier device according to claim 9, wherein the processor is configured to detect a plurality of parameters of the carrier signal and to compare each of the plurality of parameters with a corresponding standard value respectively so as to determine whether the carrier signal is correct, in which the plurality of parameters comprise one or more of a duty ratio of the carrier signal, an amplitude of the carrier signal, a number of data items in the carrier signal and a number of times of sending a same data item.

11. The carrier device according to claim 9, wherein the processor is further configured to re-determine whether the carrier signal is detected at the interface harness when the carrier signal is neither received via the interface harness nor received via the SCI within the predetermined initial time.

* * * * *